United States Patent [19]
Cava et al.

[11] Patent Number: 6,093,668
[45] Date of Patent: Jul. 25, 2000

[54] LOW TEMPERATURE COEFFICIENT DIELECTRIC MATERIALS AND DEVICES COMPRISING SAME

[75] Inventors: Robert Joseph Cava, Princeton; James Joseph Krajewski, Raritan, both of N.J.

[73] Assignee: Lucent Technologies Inc., Murray Hill, N.J.

[21] Appl. No.: 09/222,110

[22] Filed: Dec. 29, 1998

[51] Int. Cl.[7] ........................... C04B 35/465; C04B 35/49
[52] U.S. Cl. ..................... 501/136; 264/681; 333/219.1
[58] Field of Search ........................... 501/136; 264/681; 333/219.1

[56] References Cited

U.S. PATENT DOCUMENTS 4,438,214  3/1984  Masuyama et al. .................... 501/136
5,525,562  6/1996  Kagata et al. ......................... 501/135

FOREIGN PATENT DOCUMENTS 3445153   6/1985  Germany ............................. 501/136
45-27626  9/1970  Japan ................................... 501/136
52-18397  5/1977  Japan ................................... 501/136
56-76110  6/1981  Japan ................................... 501/136

*Primary Examiner*—David Brunsman
*Attorney, Agent, or Firm*—Mathews, Collins, Shepherd & Gould, P.A.

[57] ABSTRACT

Dielectric materials comprising $Ca_5R_2XO_{12}$ in which R is either Nb or Ta and X is selected from Ti and $Ti_{1-x}Zr_x$ have high dielectric constants (Ks), relatively low dielectric losses (Q), and low TCKs. The dielectric properties are affected by processing conditions, which for the both the niobate and tantalate embodiments preferably involve sintering and re-firing dielectric pellets at temperatures of 1400° C. and above. The dielectric materials are particularly useful for microwave communications applications.

19 Claims, 6 Drawing Sheets

LOW TEMPERATURE COEFFICIENT DIELECTRIC MATERIALS AND DEVICES COMPRISING SAME

FIELD OF THE INVENTION

The invention relates to dielectric materials having high dielectric constants and relatively low temperature coefficients of dielectric constants and, in particular, to dielectric materials comprising $Ca_5R_2XO_{12}$ in which R is either Nb or Ta and X is selected from Ti and $Ti_{1-x}Zr_x$. The invention is particularly useful for microwave communications applications.

BACKGROUND OF THE INVENTION

As microwave communications technologies continue their rapid progress, the demands for further miniaturization require continuing discovery and development of new materials. Dielectric materials useful for microwave resonators and filters must satisfy stringent physical property requirements. In the vicinity of ambient temperature, the materials should have a high dielectric constant (K), low dielectric loss (high Q), and low temperature coefficient of dielectric constant (TCK)—properties which are generally mutually exclusive. These requirements greatly restrict the availability of materials useful for actual devices. It is particularly important that the materials have low TCKs as devices used in microwave systems require high thermal stability.

There are currently several materials being developed for such use, e.g., based on barium titanates or tantalates and zirconium-tin titanate, with dielectric constants in the range of 20–90, Q values ranging from about 20,000 down to about 2,000 (materials having higher dielectric constants will have lower Q values), and TCKs of less than 10 ppm/° C. See, e.g., P. K. Davies, "*Materials and Processes for Wireless Communications,*" CERAMIC TRANSACTIONS Vol. 53 (American Ceramic Society, Ohio 1996), at p. 137, and T. Negas, G. Yeager, S. Bell, and R. Amren, "*Chemistry of Electronic Ceramic Materials,*" NIST SPECIAL PUBLICATION, Vol.804 (1990), at p. 21. Bulk ceramics comprising $Ba_2Ti_9O_{20}$, $Ba_{6-3x}Ln_{8+2x}Ti_{18}O_{54}$, and $Zr(Ti_{1-x}Sn_x)O_4$ are in use for macroscopic dielectric components employed in microwave communications devices, as disclosed in H. M. O'Bryan, J. Thomson, and J. K. Plourde, J. AM. CERAM. SOC. Vol. 57 (1974), at p. 450; T. Negas, G, Yeager, S. Bell and N. Coats, AM. CERAM. SOC. BULL. Vol. 72 (1993), at p. 80; and S. Nishigaki, H. Kato, S. Yano, and R. Kamimura, CERAMIC BULLETIN Vol. 66 (1987), at p. 1405. A dielectric material for use in a microwave resonator comprising barium oxide and titanium dioxide as the primary components is disclosed in U.S. Pat. No. 5,332,984 issued to Abe, et als., on Jul. 26, 1994, entitled "Dielectric Resonator or Filter for Microwave Application, and Method of Producing the Dielectric Resonator or Filter," which is incorporated by reference. Zirconium-tin titanate dielectrics having a TCK dependent on processing conditions are disclosed in R. Christoffersen, P. K. Davies, X. Wei, and T. Negas, J. Am. CERAM. Soc., Vol.77 (1994), at p. 1441.

As may be appreciated, those concerned with microwave communications systems and technologies continually search for new dielectric materials for use in such systems that have improved dielectric properties or offer the market a competitive choice among the materials available for use in these systems. The instant invention provides a dielectric material which has at least two embodiments comprising $Ca_5Nb_2TiO_{12}$ or $Ca_5Ta_2TiO_{12}$, wherein the titanium optionally may be partially substituted with zirconium; these materials have dielectric properties meeting the stringent requirements for microwave communications applications.

SUMMARY OF THE INVENTION

Summarily described, the invention comprises the dielectric material $Ca_5R_2XO_{12}$ in which R is either Nb or Ta and X is selected from Ti and $Ti_{1-x}Zr_x$. These materials have useful dielectric properties in that they exhibit a relatively high dielectric constant, low temperature coefficient of dielectric constant (TCK), and low loss (high Q factor). The dielectric materials comprising Nb or Ta without Zr may be prepared under preferred conditions to have a dielectric constant near or above 25, high quality factor (Q≈5000), and TCK of less than about 10 ppm/° C. The embodiment comprising $Ti_{1-x}Zr_x$ may be prepared to have comparable dielectric properties utilizing a range of preparation conditions.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention without limiting the scope thereof.

DETAILED DESCRIPTION OF THE INVENTION

Applicants have discovered dielectric materials comprising $Ca_5Nb_2TiO_{12}$ and $Ca_5Ta_2TiO_{12}$ perovskites, which further may comprise $Ca_5Ta_2Ti_{1-x}Zr_xO_{12}$. An exemplary application for these perovskites, their preparation and characterization, and their properties are described below in Parts A through C. Part A includes a description of an application of the dielectric materials with reference to use of the materials in a microwave filter. Part B describes a method for preparing the dielectric materials and initial characterization of the materials. And Part C describes properties and preferred embodiments of the dielectric materials.

A. Application Example

Figure 1:
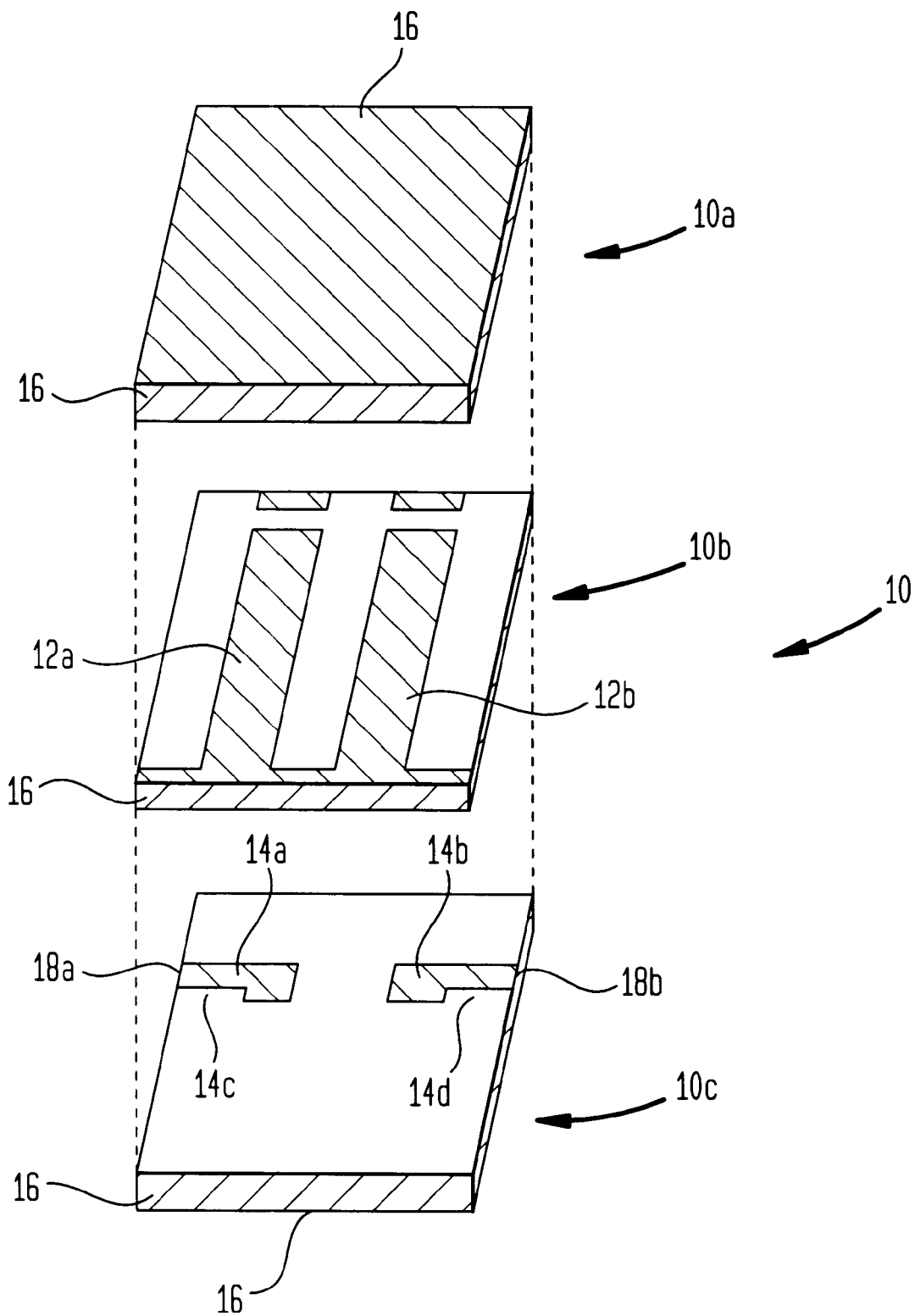
FIG. 1 shows a perspective view of a filter for use in a microwave communications system of the stripline type comprising the inventive dielectric material.

FIG. 1 shows a perspective view of a filter for use in a microwave communications systems of the stripline type. The filter comprises a dielectric substrate 10 having three layers 10a, 10b, and 10c, wherein each structure is comprised of inventive dielectric materials. Electrodes are incorporated into the layers of the substrate 10, including a pair of resonator electrodes 12a, 12b, disposed on the intermediate layer 10b, and coupling electrodes 14a, 14b, disposed on the bottom or end layer 10c. An earth electrode 16 covers substantially the entire outer circumference of the dielectric substrate 10. The coupling electrodes 14a, 14b, are connected by extensions 14c, 14d, to input and output contacts 18a, 18b.

By way of illustration, therefore, FIG. 1 shows an exemplary microwave filter in which the dielectric materials of this invention may be incorporated; however, it is to be understood the invention is not limited to use with the filter shown. For example, the dielectric materials may be used in bulk-type resonators or in other applications besides microwave communications systems.

B. Material Preparation and Characterization

The dielectric materials of this invention are single-phase polycrystalline ceramics involving the mixing of three cations on the perovskite small atom ("B") site. The perovskites may be described as $Ca_4(CaNb_2Ti)O_{12}$ and $Ca_4(CaTa_2Ti)O_{12}$. Calcium, titanium, and either niobate or tantalum are mixed on the octahedral site. Zirconium may be partially substituted for titanium which was found to be advantageous. The dielectric material may be prepared by mixing and firing powders of $CaCO_3$, $Nb_2O_5$, $Ta_2O_5$, and $TiO_2$, optionally with $ZrO_2$ partially substituted for $TiO_2$; forming the mixed and fired powders into small masses (e.g., pellets and then sintering the masses at high temperatures and for a period of time sufficient to obtain the desired dielectric constants and TCK values, e.g., at about 1400° C. and above. Preparation examples are set forth below which are instructive and not limiting in nature.

EXAMPLE 1

Dielectric materials $Ca_5Nb_2TiO_{12}$ and $Ca_5Ta_2TiO_{12}$ were prepared using as starting materials high purity $CaCO_3$, $Nb_2O_5$, $Ta_2O_5$, and $TiO_2$ powders. Thirty gram batches were weighed out at the appropriate stoichiometric ratios and ground in an automatic agate mortar and pestle for 30 minutes. The mixed powders were fired in air in dense $Al_2O_3$ crucibles for 16 hours at 1200° C. The reacted powders were ball milled for about 3 hours (using $ZrO_2$ balls). The powders were then dried and automatically ground again for 15 minutes. Polycrystalline pellets of ½ inch diameter were then pressed, without binder, to a pressure of 4000 psi. Once the pellets were formed, they were sintered for approximately 3 hours on a dense $Al_2O_3$ setter on powder of their own composition in air at temperatures between 1400 and 1600° C. and furnace cooled. Experimental temperatures were spaced in 25 degree intervals, e.g., 1400° C., 1425° C., 1450° C., 1475° C., 1500° C., and so forth, up to 1600° C.

Preliminary experiments indicated the total processing time and temperature was important in determining the dielectric properties of the materials. Experiments were performed to obtain dielectric measurements for different processing conditions. In one set of experiments, pellets of dielectric material were "single-fired," and in another set of experiments, pellets were "repeat-fired." For the single-fired pellets (also referred to herein as the "new pellets"), a new sample pellet was made from calcined powder and freshly sintered for a three-hour period at each experimental temperature. The dielectric properties of these pellets were measured after they were sintered once at a selected temperature along the range 1400–1600° C. For the repeat-fired pellets, samples were initially sintered for a three-hour period at a given experimental temperature (starting at 1400° C.), and their dielectric properties were measured. After the initial sintering and measurement, the pellets were then fired for a three-hour period at a temperature 25 degrees higher than the sintering temperature (e.g., starting at 1425° C.), and the dielectric properties were again measured. The process of firing and measurement was repeated for these pellets at intervals of 25° C., so that pellets were repeat-fired for a three-hour period at each experimental temperature along the range 1425° C. to 1600° C., e.g., up to the temperature of 1600° C.

The purity of the samples was investigated by powder X-ray diffraction (CuKa radiation). The patterns, recorded in an interval of 4–60 degrees 2Θ, agreed with those for given single-phase $Ca_5Nb_2TiO_{12}$ and $Ca_5Ta_2TiO_{12}$. The patterns therefore confirmed the single-phase nature of these compositions when heated at 1400° C. and above. Dielectric properties were measured with an HP 4192A impedance meter at an applied AC signal of 1 volt in the frequency range of 100 KHz to 10 MHz. No frequency dependence of the dielectric properties was observed. Electrodes applied to the pellet faces were 1:1 Ga:In alloy. Temperature control was achieved with a Ransco controlled environment chamber. Dielectric measurements were made and are set forth below in Part C in Tables 1 and 2 for temperatures ranging from 0 to 100° C.

EXAMPLE 2

Dielectric materials $Ca_5Nb_2Ti_{1-x}Zr_xO_{12}$ were prepared using as starting materials high purity $CaCO_3$, $Nb_2O_5$, $TiO_2$, and $ZrO_2$ powders. Thirty gram batches were weighed out at the appropriate stoichiometric ratios, and materials in which values of x were 0.01, 0.03, 0.05, and 0.10 and higher were prepared and tested. The processes for mixing, grinding, and pre-reaction firing were as above in Example 1. For these $Ca_5Nb_2Ti_{1-x}Zr_xO_{12}$ samples, "single-fired" pellets were prepared and analyzed. A three-hour single-fire sintering step was used at a single temperature for each pellet, followed by furnace cooling. Pellets were fired for the three-hour period at 1425° C., 1450° C., 1475° C., 1500° C., and 1525° C. Dielectric measurements were made as with the pellets of Example 1. The results are set forth below in Part C in Table 3.

C. Properties and Preferred Composites

In the vicinity of ambient temperature, the dielectric constants for the embodiments $Ca_5Nb_2TiO_{12}$ and $Ca_5Ta_2TiO_{12}$ when processed at preferred conditions were found to be at least about 35 and 23, respectively; the dielectric losses were low, with Qs on the order of about 5000; and the temperature coefficient of dielectric constants were also low, e.g., less than about 10 ppm/° C. The dielectric properties were found to be dependent on the processing conditions. The data indicates that an order-disorder transition among the B-site ions is substantially related to the temperature dependence of the dielectric constant for both embodiments. The unit cell has orthorhombic symmetry with a cell volume involving multiple simple perovskite subcells.

Dielectric data is set forth below in Tables 1 and 2, with Table 1 reflecting data for the niobate embodiment and Table 2 reflecting data for the tantalate embodiment.

TABLE 1

SUMMARY OF DIELECTRIC PROPERTIES OF $Ca_5Nb_2TiO_{12}$

| Sintering Temp ° C. | Measurement Temperature | | | | | | TCK ppm/° C. |
|---|---|---|---|---|---|---|---|
| | 0° | 20° | 40° | 60° | 80° | 100° | |
| 1400 | 33.31 | 33.26 | 33.20 | 33.14 | 33.10 | 33.08 | −69.40 |
| 1425-new | 24.36 | 24.33 | 24.30 | 24.29 | 24.27 | 24.24 | −46.90 |
| 1425-rep | 34.34 | 34.30 | 34.28 | 34.24 | 34.23 | 34.22 | −36.35 |
| 1450-new | 35.02 | 34.99 | 34.96 | 34.93 | 34.92 | 34.90 | −36.50 |
| 1450-rep | 35.62 | 35.61 | 35.61 | 35.60 | 35.61 | 35.61 | −3.07 |
| 1475-new | 36.26 | 36.23 | 36.22 | 36.20 | 36.19 | 36.19 | −19.00 |
| 1475-rep | 36.34 | 36.34 | 36.34 | 36.35 | 36.36 | 36.37 | 9.07 |
| 1500-new | 33.48 | 33.47 | 33.46 | 33.44 | 33.43 | 33.41 | −21.60 |
| 1500-rep. | 36.56 | 36.56 | 36.56 | 36.56 | 36.57 | 36.58 | 4.51 |
| 1525-new | 44.03 | 43.91 | 43.81 | 43.70 | 43.60 | 43.52 | −116.90 |
| 1525-rep | 44.70 | 44.58 | 44.48 | 44.38 | 44.29 | 44.21 | −109.49 |
| 1550-new | 43.06 | 42.96 | 42.85 | 42.74 | 42.65 | 42.57 | −115.50 |
| 1550-rep | 45.00 | 44.92 | 44.80 | 44.69 | 44.61 | 44.53 | −105.33 |

TABLE 2

SUMMARY OF DIELECTRIC PROPERTIES OF $Ca_5Ta_2TiO_{12}$

| Sintering Temp ° C. | Measurement Temperature | | | | | | TCK ppm/° C. |
|---|---|---|---|---|---|---|---|
| | 0° | 20° | 40° | 60° | 80° | 100° | |
| 1400 | 20.25 | 20.21 | 20.17 | 20.14 | 20.11 | 20.11 | −72.65 |
| 1425-new | 20.1 | 20.06 | 20.05 | 20.04 | 20.02 | 20.01 | −45.89 |
| 1425-rep | 22.69 | 22.68 | 22.66 | 22.65 | 22.65 | 22.65 | −17.74 |
| 1450-new | 22.87 | 22.86 | 22.85 | 22.84 | 22.84 | 22.84 | −13.6 |
| 1450-rep | 23.76 | 23.76 | 23.75 | 23.76 | 23.76 | 23.77 | 6.6 |
| 1475-new | 24.07 | 24.07 | 24.071 | 24.074 | 24.077 | 24.091 | 8.22 |
| 1475-rep | 24.43 | 24.43 | 24.45 | 24.47 | 24.48 | 24.49 | 26.91 |
| 1500-new | 21.63 | 21.71 | 21.71 | 21.72 | 21.73 | 21.73 | 48.21 |
| 1500-rep | 25.59 | 25.61 | 25.63 | 25.65 | 25.68 | 25.71 | 46.12 |
| 1525-new | 22.94 | 22.98 | 23.02 | 23.04 | 23.05 | 23.06 | 53.46 |
| 1525-rep | 26.61 | 26.63 | 26.66 | 26.68 | 26.71 | 26.74 | 51.92 |
| 1550-new | 23.97 | 24 | 24.02 | 24.06 | 24.06 | 24.07 | 42.63 |
| 1550-rep | 27.4 | 27.46 | 27.49 | 27.51 | 27.55 | 27.59 | 68.41 |
| 1575-new | 22.93 | 22.94 | 22.95 | 22.96 | 22.97 | 22.98 | 19.96 |
| 1575-rep | 28.52 | 28.57 | 28.59 | 28.63 | 28.66 | 28.7 | 60.53 |
| 1600-new | 25.03 | 25.04 | 25.04 | 25.03 | 25.02 | 25.01 | −7.79 |
| 1600-rep | 23.05 | 23.05 | 23.04 | 23.03 | 23.02 | 23.01 | −16.17 |

Tables 1 and 2 above present dielectric constant values measured at 1 MHz and at 20° temperature intervals from 0° C. to 100° C., for single-fired pellets and repeat-fired pellets. The rows designated as "new" report data for single-fired pellets, and the rows designated as "rep" report data for repeat-fired pellets. The temperature coefficient of dielectric constants (TCKs), defined as $(K_{100}-K_{20})/K_{20}$, in ppm per degree C, are reported in the far-right column of Tables 1 and 2 for all firing temperatures. In all cases, the dielectric loss values at 1 MHz are approximately zero for Q values estimated to be on the order of 5000. As can be seen, the dielectric constants are in the range of about 33–35 for the niobate embodiment and 20–28 for the tantalate embodiment. For $Ca_5Nb_2TiO_{12}$, the best materials (those having high dielectric constants and low TCKS) were obtained for repeat-fired samples at temperatures of 1450° C., 1475° C., and 1500° C. For $Ca_5Ta_2TiO_{12}$, the best materials were obtained for repeat-fired samples at the temperature of 1450° C., and for single-fired samples sintered at the temperatures of 1475 and 1600° C. In any case, materials may be prepared in which the dielectric constant is at least about 23 while the TCK of the material ranges from minus 10 ppm/° C. to plus 10 5 ppm/° C.

Figure 2A:
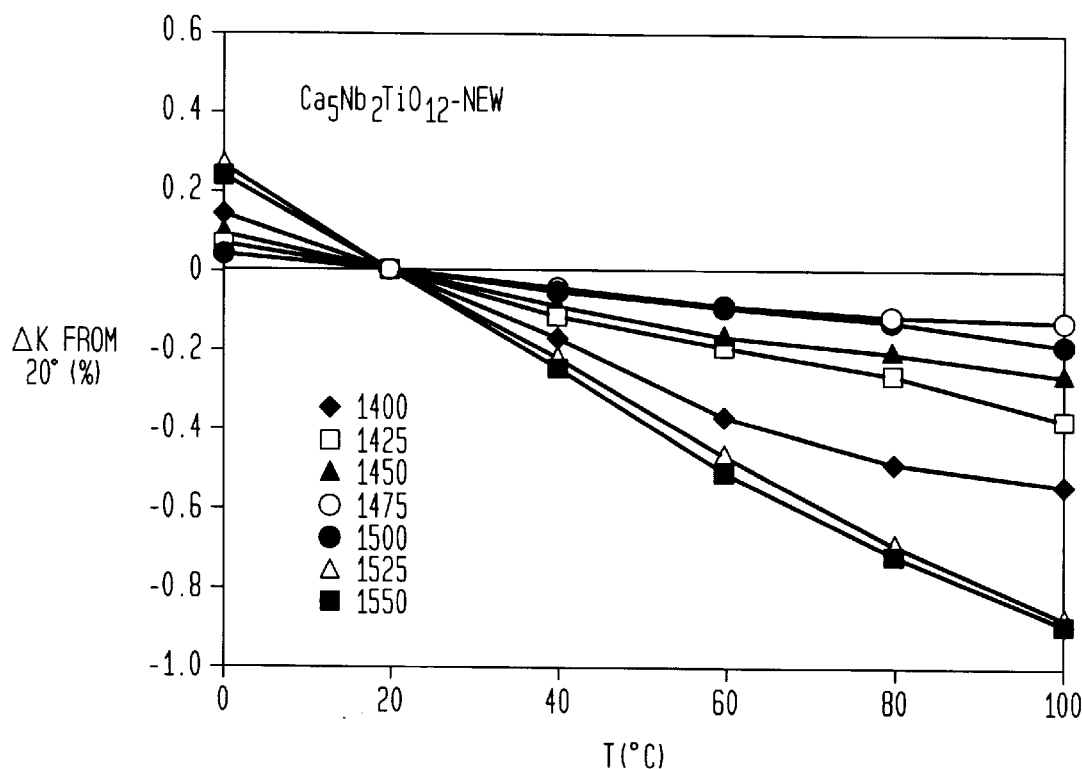
FIGS. 2A and 2B are graphical illustrations of the percent deviation of the dielectric constant measured at 1 MHz at various temperatures for the niobate embodiment of the invention, in which FIG. 2A reflects values for single-fired or "new" pellets and FIG. 2B reflects values for repeat-fired pellets.
Figure 2B:
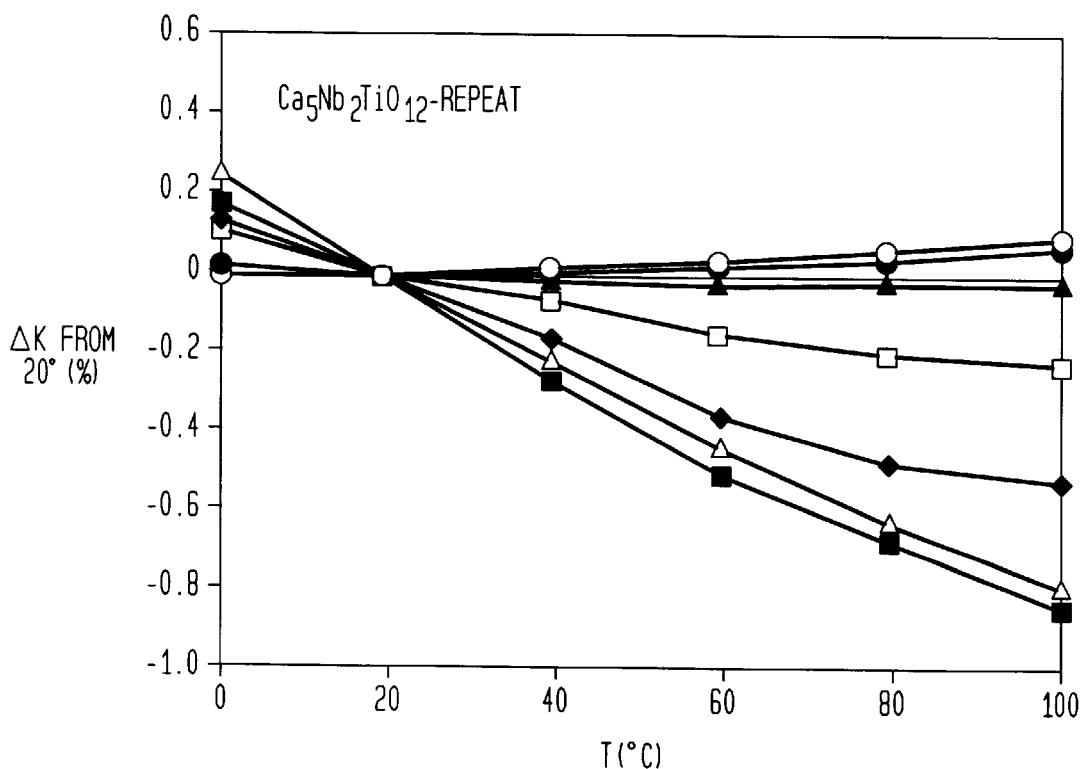
Figure 3A:
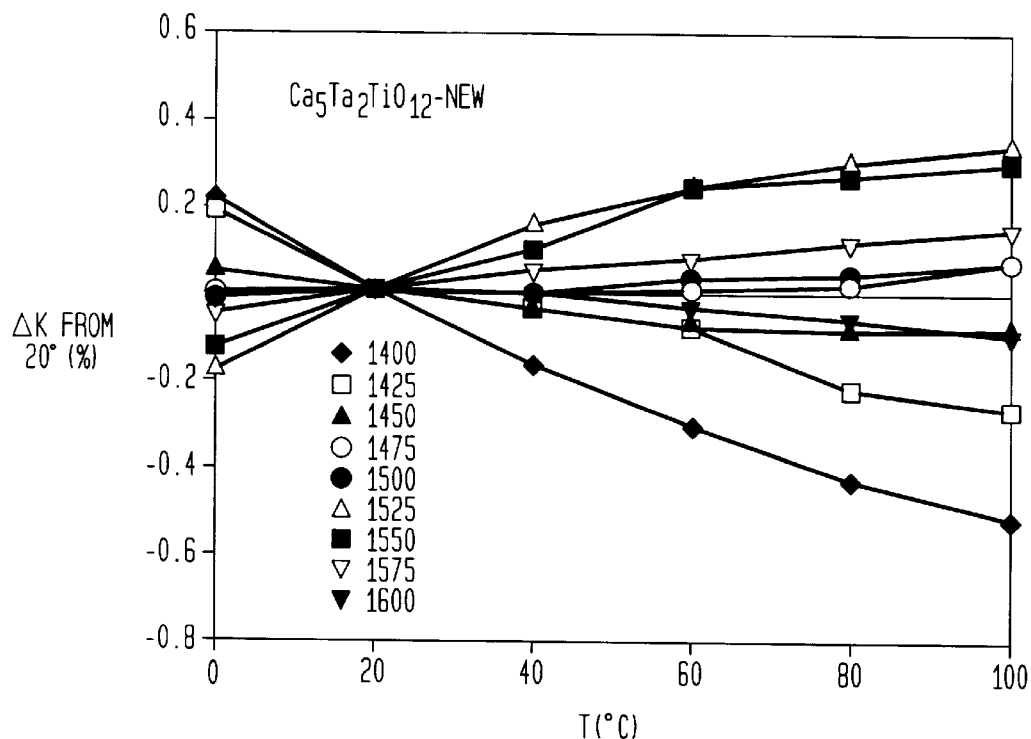
FIGS. 3A and 3B are graphical illustrations of the percent deviation of the dielectric constant measured at 1 MHz at various temperatures for the tantalate embodiment of the invention, in which FIG. 3A reflects values for single-fired ("new") pellets and FIG. 3B reflects values for repeat-fired pellets.
Figure 3B:
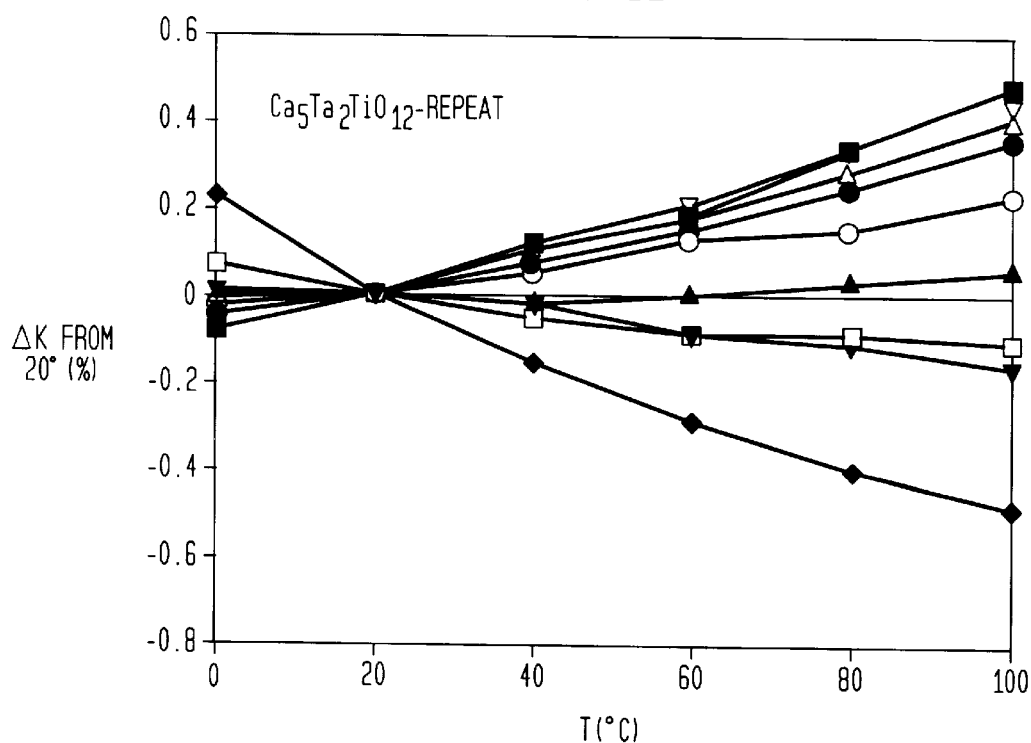

FIGS. 2A and 2B graphically illustrate the percent deviation from the 20° C. value of the dielectric constant measured at 1 MHz at various temperatures for the niobate embodiment of the invention, and FIGS. 3A and 3B reflect the same values for the tantalate embodiment.

FIGS. 2A and 3A plot data for single-fired ("new") pellets, and FIGS. 2B and 3B plot values for repeat-fired pellets, as previously described. The variation in slope, reflecting the percent deviation of K for various temperatures, can be easily seen in these figures. For example, looking at FIGS. 2A and 2B, relatively large negative values are generally reported for lower temperatures (e.g., for 1400° C., the plot slopes from about 0.15 downward to about 0.5); smaller values are reported for intermediate temperatures (the slopes are nearly linear where the temperatures are at about 1450 to 1500° C.), with positive values reported for repeat-fired samples; and then, there is a return to larger negative values (an increased slope) for the highest temperatures (1525–1550° C.). This behavior of the temperature coefficient of dielectric constant is surprisingly unusual, e.g., a change in the firing temperature by 25° C. may have a substantial impact upon the dielectric properties.

Figure 4A:
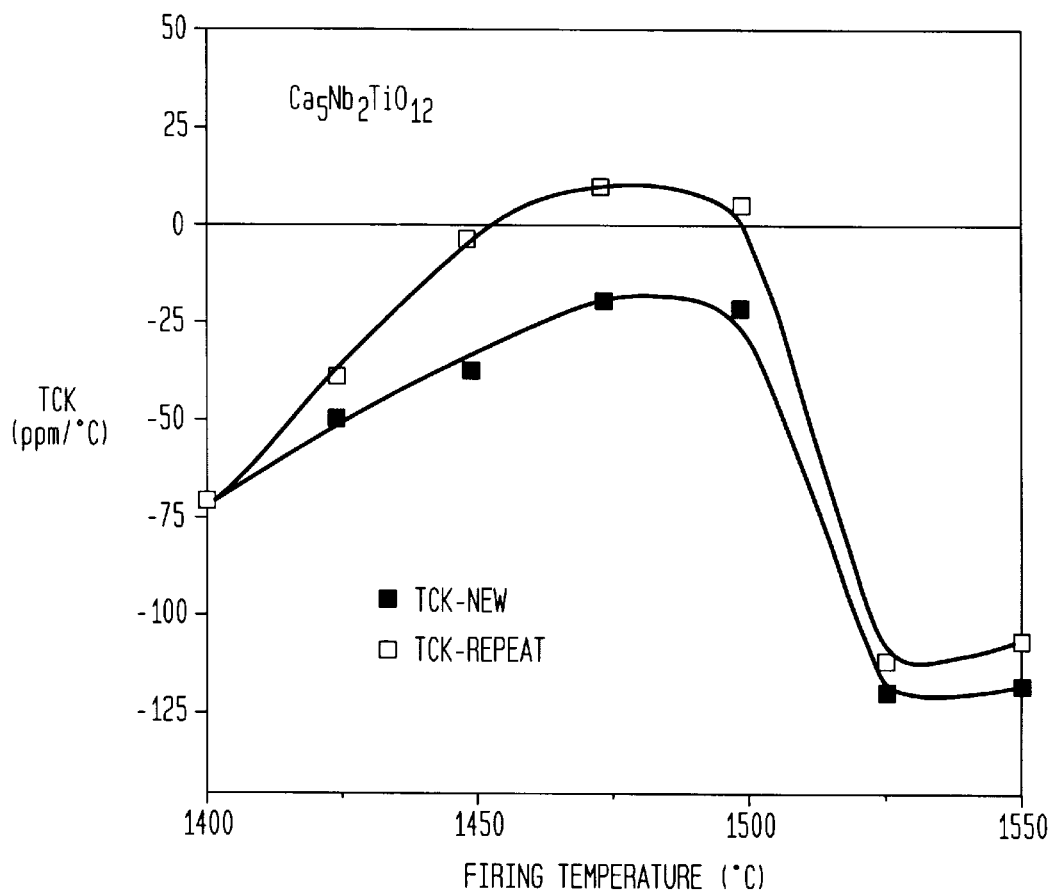
FIGS. 4A and 4B are graphical illustrations of the temperature coefficient of dielectric constant (TCK) and dielectric constant (K), respectively, for the niobate embodiment fired at different sintering temperatures in which the blackened circles reflect values for single-fired ("new") pellets and the white circles reflect values for repeat-fired pellets.
Figure 4B:
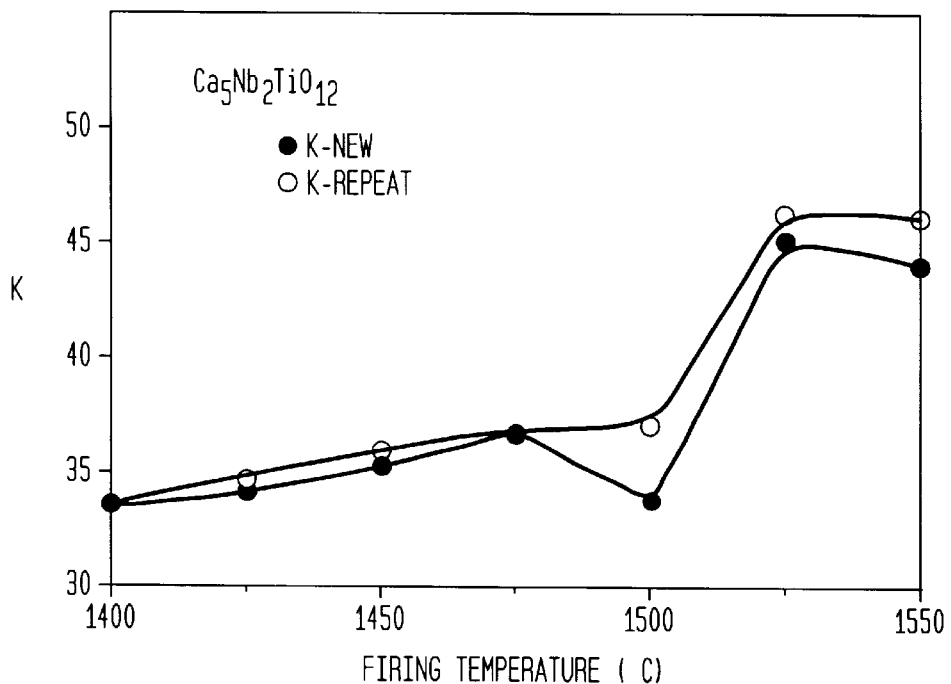
Figure 5A:
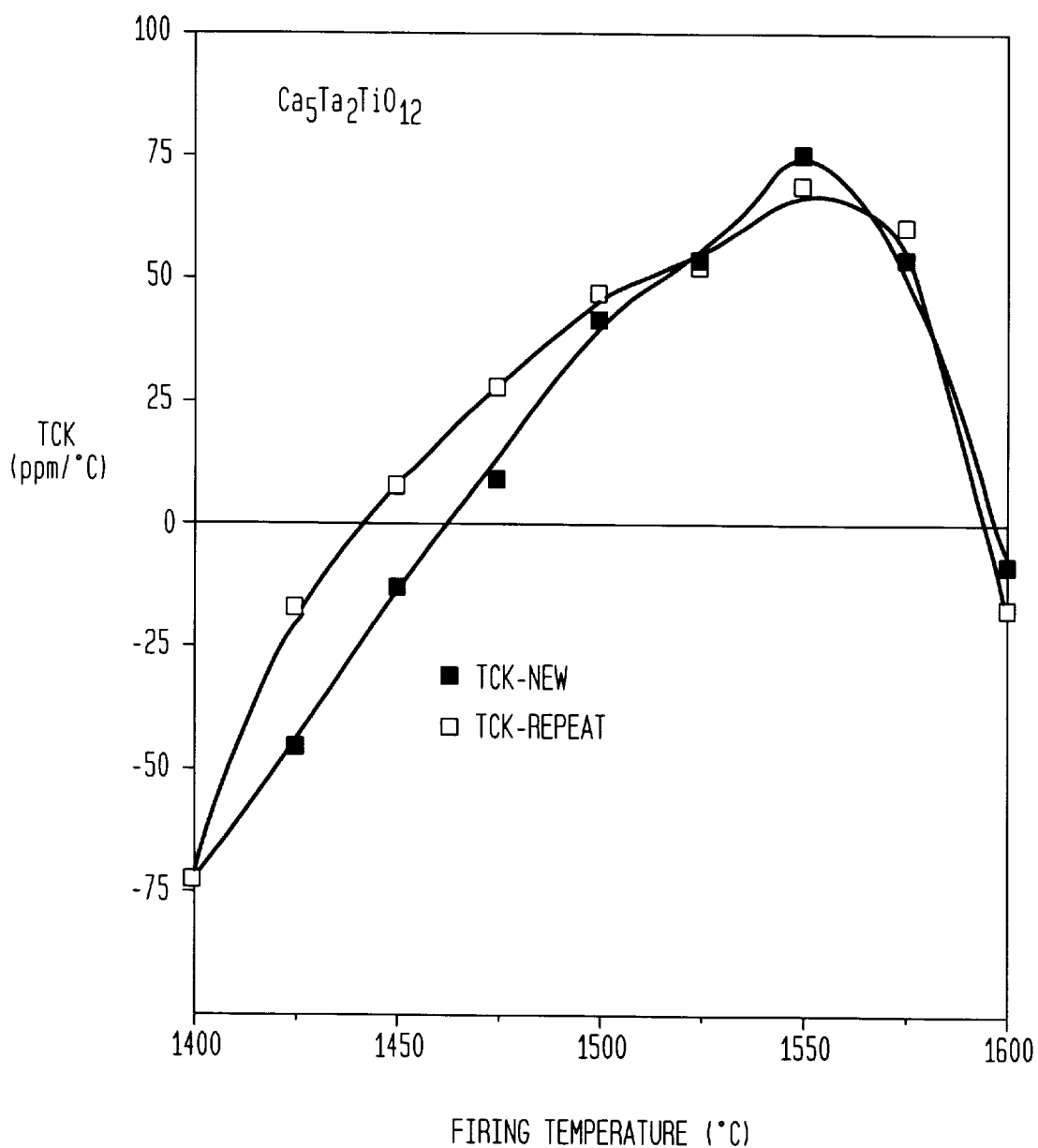
FIGS. 5A and 5B are graphical illustrations of the temperature coefficient of dielectric constant (TCK) and dielectric constant (K), respectively, for the tantalate embodiment fired at different sintering temperatures in which the blackened circles reflect values for single-fired ("new") pellets and the white circles reflect values for repeat-fired pellets.
Figure 5B:
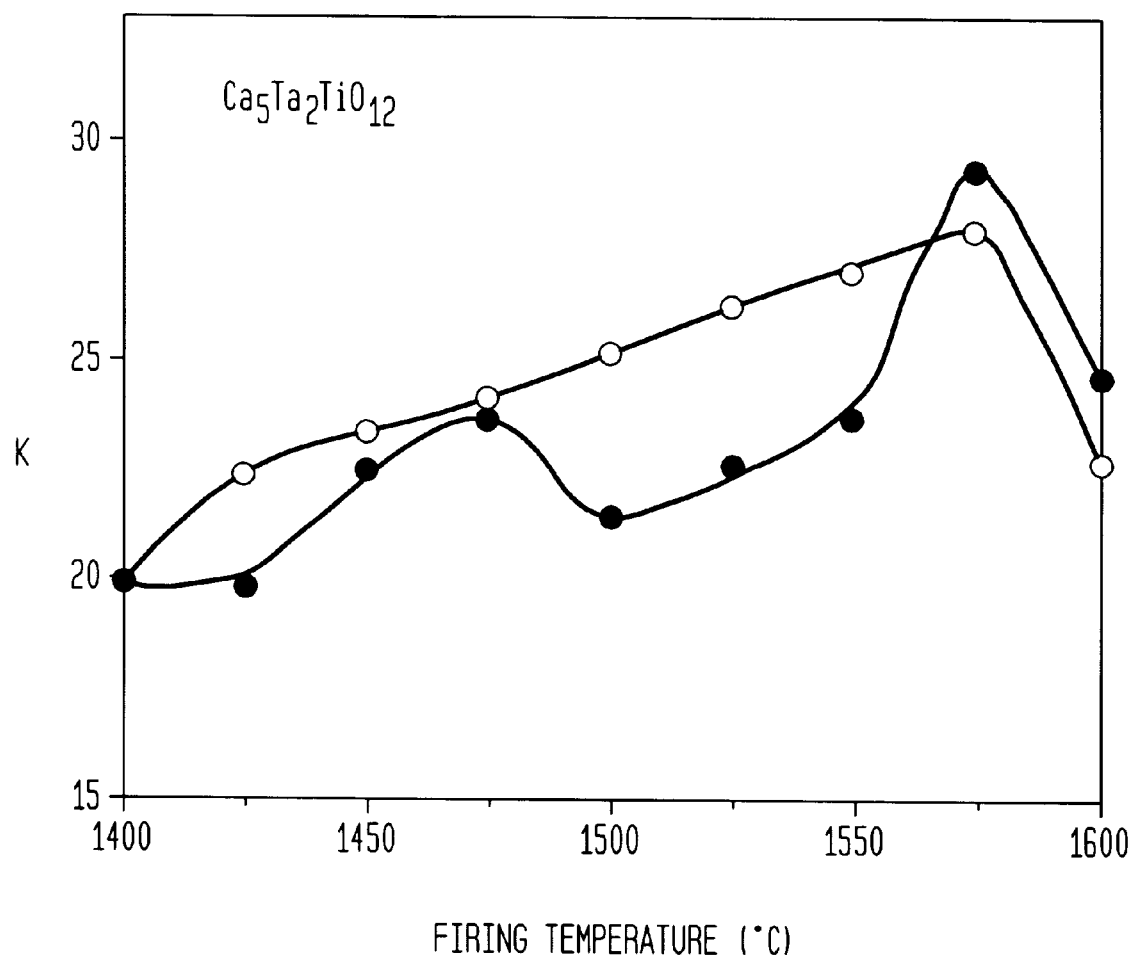

FIGS. 4A through 5B are graphical illustrations plotting data for the temperature coefficient of dielectric constant (TCK) and dielectric constant (K) for single-fired and repeat-fired pellets. In these graphs, blackened circles reflect values for single-fired ("new") pellets and white circles reflect values for repeat-fired pellets. FIGS. 4A and 4B plot TCK and K data, respectively, for the niobate embodiment, and FIGS. 5A and 5B plot the same data for the tantalate embodiment.

Looking at FIGS. 4A and 5A, it can be seen that the firing schedule affects the magnitude of the temperature coefficients, and the same general trend is followed for both embodiments, that is, the TCKs are negative at lower temperatures (e.g., near −75 for 1400° C.); they increase at intermediate temperatures (e.g., to above zero for firing temperatures of 1475° C. and 1500° C. for all the embodiments except the single-fired niobate embodiment), and they drop to negative values at higher temperatures. There is a highly unusual double crossing of the zero-TCK-line for all embodiments except the single-fired niobate embodiment. Although a positive TCK is not shown for the single-fired niobate, small negative values are obtained. The temperature at which a positive TCK region is reached on heating is shifted downward (to the left in the graph) for repeat-fired pellets, which is particularly evident in FIG. 5A. At higher temperatures, the negative TCK behavior returns. For both materials, the transition occurs abruptly, with a rapid decrease in TCK, as can be seen from the steep downward slope of the plots in FIGS. 4A and 5A as higher temperatures are reached.

Thus, the data indicates that the atomic configuration which gives rise to the positive TCK state in these materials may be formed over a period on the scale of hours. This shows the positive TCK state is related to the formation of an ordered state of cations on the B sites. This ordered state is probably short-range or otherwise subtle in nature, as the conventional powder X-ray diffraction patterns do not show the appearance of new diffraction peaks in the corresponding temperature interval. The rapid decrease in TCK at higher temperatures, which is independent of firing time, suggests the presence of a high temperature order-disorder transition. The conventional powder X-ray diffraction patterns reveal that the materials remain single-phase perovskites throughout the range of temperatures explored and that there has been no large-scale structural rearrangement. The diffraction patterns reveal a decreasing unit cell volume with increasing firing temperature and a decreasing orthorhombic distortion.

Looking at FIGS. 4B and 5B, dielectric constants are plotted for the niobate and tantalate embodiments for different firing temperatures. As with the TCKs, the firing schedule affects the magnitude of the dielectric constants, and the same general trend is followed for both embodiments, that is, the dielectric constants follow a generally increasing trend with increased firing temperatures until a plateau is reached (at about 1525° C. for the niobate and 1575° C. for the tantalate), at which point the dielectric constants decrease.

Applicant has further discovered that processing of the dielectric materials may be simplified by adding small amounts of Zr to X in the formula $Ca_5R_2XO_{12}$ (e.g., where X is selected from Ti and $Ti_{1-x}Zr_x$) to provide the embodiment $Ca_5R_2Ti_{1-x}Zr_xO_{12}$. With this embodiment, desired dielectric properties may be obtained with use of a step involving sintering the pellets at a single temperature (e.g., with "single-fired pellets"), and preferable properties may be maintained with variations in sintering conditions which is advantageous for commercial production. For example, below in Table 3 is reported dielectric data for the embodiment $Ca_5Nb_2Ti_{1-x}Zr_xO_{12}$ in which the value of x ranges from 0.01 to 0.10. Although higher values of x were analyzed and are included within the concept of the invention, it was found that preferred properties were obtained when the zirconium substitution ranged from between 1 to 10% titanium (atomic percent), and more preferably when the zirconium substitution comprised 3%.

TABLE 3

SUMMARY OF DIELECTRIC PROPERTIES
OF $Ca_2Nb_2Ti_{1-x}Zr_xO_{12}$

| Sintering Temp° C. | Value for X: Zirconium Substitution | | | | | | | | | |
|---|---|---|---|---|---|---|---|---|---|---|
| | 0.0 | | 0.01 | | 0.03 | | 0.05 | | 0.10 | |
| | K | TCK | K | TCK | K | TCK | K | TCK | K | TCK |
| 1425 | 28 | −54 | 29 | −48 | 30 | −40 | 32 | −8 | 28 | −23 |
| 1450 | 29 | −35 | 31 | −20 | 32 | −9 | 28 | 5 | 30 | −11 |
| 1475 | 31 | −35 | 33 | −26 | 33 | −4 | 34 | +4 | 31 | +1 |
| 1500 | 32 | −6 | 32 | 1 | 34 | −1 | 39 | −62 | 33 | 26 |
| 1525 | 38 | −76 | 37 | −80 | 36 | −51 | 40 | −66 | 36 | −7 |

Table 3 above presents dielectric constant values measured at 1 MHz and at 20° C. for single-fired pellets. As can be seen, dielectric constants at 28 and above were obtained with TCKs of less than 10 ppm/° C. for single-fired pellets in the temperature range between 1425 and 1500° C. Particularly advantageous were the materials where x was 0.03 and the sintering temperature was from 1450 to 1500° C., and where x was 0.05 and the sintering temperature was from 1425 to 1475° C.

It will be understood that the embodiments described herein are merely exemplary and that a person skilled in the art may make variations and modifications without departing from the spirit and scope of the invention. For example, although the invention is illustrated with regard to use in a microwave stripline filter, the inventive dielectric material may be used in other applications as well. All such variations and modifications are intended to be included within the scope of the appended claims.

We claim:

1. An article including a dielectric material comprising $Ca_5R_2XO_{12}$ in which R is either Nb or Ta and X is selected from Ti and $Ti_{1-x}Zr_x$ wherein x is less than 1.

2. The article of claim 1 in which the material has desired dielectric properties, wherein the dielectric constant of the material, when measured at 20° C. and 1 MHz, is at least about 23 and the range of temperature coefficient of dielectric constant (TCK) of the material is in the range from +10 ppm/° C. to −10 ppm/° C., the dielectric constant and TCK defining the desired dielectric properties.

3. The article of claim 2 in which the value of x is from about 0.01 to 0.10.

4. The article of claim 2 in which the value of x is from 0.03 to 0.05.

5. The article of claim 4, in which the dielectric material is prepared by sintering a mass of the dielectric material at a sintering temperature in the range of about 1425° C. to 1500° C. for a period of time sufficient to obtain the desired dielectric properties.

6. The article of claim 2 in which the dielectric material is prepared by sintering a mass of dielectric material at a temperature in the range of about 1400° C. to 1600° C. and for a period of time sufficient to obtain the desired dielectric properties.

7. The article of claim 2 in which the dielectric material is prepared by sintering a mass of the dielectric material at a given sintering temperature in the range of about 1400° C. to 1600° C., furnace cooling the mass, and firing the mass at a temperature in the range of about 1400° C. to 1600° C. for a period of time sufficient to obtain the desired dielectric properties.

8. The article of claim 7, comprising $Ca_5R_2TiO_{12}$ in which R is selected from Nb or Ta, and the sintering and firing temperatures are in the range of about 1425° C. to 1500° C.

9. The article of claim 1, in which R is Nb, the value of x is 0, and the dielectric constant of the material, when measured at 20° C. and 1 MHz, is about 35 or higher and the temperature coefficient of dielectric constant (TCK) of the material is in the range from +5 ppm/° C. to −5 ppm/° C.

10. The article of claim 1, in which R is Ta and the value of x is 0.

11. The article of claim 1 comprising a single-phase polycrystalline ceramic.

12. A dielectric resonator for use in a microwave telecommunication system comprising the dielectric material according to claim 1.

13. The dielectric resonator of claim 12 comprising a substrate fabricated with the dielectric material and a plurality of conductors forming a conductor pattern on one or more surfaces of the substrate.

14. The dielectric resonator of claim 12 comprising a block of the dielectric material coated with a metal electrode.

15. A dielectric filter for use in a microwave telecommunication system comprising a plurality of resonators according to claim 12.

16. A method of fabricating a dielectric material according to claim 1, the method comprising the steps of:

mixing, firing, and pressing powders of $CaCO_3$, $TiO_2$, and $R_2O_5$, in which R is either Nb or Ta, to form a mass of dielectric material; and firing the mass at a temperature above 1200 degrees Centigrade and for a time period sufficient so that the material has a dielectric constant which, when measured at 20° C. and 1 MHz, is at least about 23 and the TCK of the material is in the range from +10 ppm/° C. to −10 ppm/° C.

17. The method of claim 16, in which the powders of the mixing, firing and pressing step further include $ZrO_2$.

18. The method of claim 16 in which the temperature is in the range of about 1400 to 1600 degrees Centigrade.

19. The method of claim 16, further comprising the step of re-firing the mass at a temperature in the range of about 1400 to 1600 degrees Centigrade.

* * * * *